United States Patent
Closner

(10) Patent No.: US 6,382,730 B1
(45) Date of Patent: May 7, 2002

(54) SEAT BELT SHOULDER HARNESS RETAINER DEVICE

(76) Inventor: Albert Closner, P.O. Box 1092, Mercedes, TX (US) 78570

(*) Notice: Subject to any disclaimer, the term of this patent is extended or adjusted under 35 U.S.C. 154(b) by 0 days.

(21) Appl. No.: 09/923,101

(22) Filed: Aug. 6, 2001

(51) Int. Cl.[7] ............................................. B60R 22/00
(52) U.S. Cl. ...................................................... 297/482
(58) Field of Search ........................................ 297/482

(56) References Cited

U.S. PATENT DOCUMENTS

| | | | |
|---|---|---|---|
| 3,957,282 A | 5/1976 | Finnigan | 297/482 |
| 4,786,080 A | 11/1988 | Jay | 297/482 |
| 5,098,162 A | * 3/1992 | Forget et al. | 297/482 |
| 5,312,159 A | * 5/1994 | Essa et al. | 297/482 |
| 5,573,306 A | 11/1996 | Galloway et al. | 297/482 |
| 5,584,536 A | 12/1996 | White | 297/482 |
| 5,620,234 A | 4/1997 | Gunby | 297/482 |
| 5,664,843 A | 9/1997 | Gleason | 297/482 |

* cited by examiner

Primary Examiner—Peter R. Brown
(74) Attorney, Agent, or Firm—Michael I. Kroll

(57) ABSTRACT

A seat belt device is provided to increase user comfort by displacing the shoulder harness in a bow off the user. Three rigid pieces receive the seat belt system shoulder harness and maintain it in a flat position within the device. The pieces adjustably telescopically extend to provide a combined length causing the top end to bear upon the positioning member and the bottom end to bear upon the latching member, the continued extension forcing a bow into the device, thus displacing the shoulder harness from the user's body. One or more of the pieces can also be arcuately shaped to create a bow, either independently, or in addition to that created by extending the pieces. The device ends can be specially adapted to receive the positioning member and/or the latching member, and can be flexible to avoid belt twisting.

30 Claims, 7 Drawing Sheets

SEAT BELT SHOULDER HARNESS RETAINER DEVICE

BACKGROUND OF THE INVENTION

1. Field of the Invention

The present invention relates generally to vehicle seat belt attachments and, more specifically, to an adjustable, modular shoulder harness retainer that will displace and retain the seat belt shoulder harness in a position away from the user's body to prevent the shoulder harness from contacting the user's torso and abdomen, while leaving it close enough to maintain the functional integrity of the seat belt.

Seat belts have been shown to be extremely effective in preventing or reducing the severity of injuries incurred during collisions yet many drivers and passengers still refuse to wear seat belts because of discomfort caused by the pressure of the shoulder harness against the neck, torso and abdomen. The pressure and friction of the shoulder harness can also dishevel clothing that a person may desire to keep neat and wrinkle-free.

The problem of shoulder harness discomfort has been addressed in prior art by attaching padded cushioning devices on the user side of the harness but they still apply pressure against the user while the cushioning device frequently exacerbates the friction placed against the user's clothing.

The present invention will virtually eliminate contact between the seat belt shoulder harness and the body of the user and also will prevent the wrinkling of clothing.

2. Description of the Prior Art

There are other shoulder harness attachments for vehicle seat belts. Typical of these is U.S. Pat. No. 5,664,843 issued to Gary W. Gleason on Sep. 9, 1997.

Another patent was issued to Joseph C. Finnigan on May 18, 1976 as U.S. Pat. No. 3,957,282. Yet another U.S. Pat. No. 4,786,080 was issued to Lawrence C. Jay on Nov. 22, 1988 and still yet another was issued on Nov. 12, 1996 to Evan M. Galloway et al. as U.S. Pat. No. 5,573,306. U.S. Pat. No. 5,584,536 was issued to Edwin J. White on Dec. 17, 1996 and another patent was issued to Judy W. Gunby on Apr. 15, 1997 as U.S. Pat. No. 5,620,234.

U.S. Pat. No. 5,664,843

Inventor: Gary W. Gleason

Issued: Sep. 9, 1997

An apparatus for biasing a portion of a seat belt shoulder harness away from a portion of a human chest. The apparatus comprises a body portion including a first end portion, a second end portion, and an intermediate portion. The body portion is deformable between a first and a second position. In the first position the intermediate portion is substantially non-coplanar with the first and second end portions, and in the second position, the intermediate portion is substantially coplanar with the end portions. The body portion is biased in the first position and is secured to the seat belt shoulder harness.

U.S. Pat. No. 3,957,282

Inventor: Joseph C. Finnigan

Issued: May, 1976

An attachment for a shoulder harness comprising a soft resilient material embracing the shoulder belt and providing a cushioning surface which enlarges as pressure is applied to it in the vicinity of the neck of the wearer to blunt the edge of the belt as it is urged toward the neck of the wearer, the same being attachable and detachable from existing shoulder harnesses. The device also allows the wearer to enjoy increased comfort while wearing the device on the shoulder belt under normal driving conditions.

U.S. Pat. No. 4,786,080

Inventor: Lawrence C. Jay

Issued: Nov. 22, 1988

A cushion for vehicle seat belts or harnesses comprising a cylindrical body of resilient material adapted to be detachably affixed to a shoulder belt adjacent the neck of the wearer. The cylindrical body is partially split along its longitudinal axis to provide a slot for reception of the belt, and a fabric sleeve is fitted over the two sections of the split cylindrical body. Fastening means are provided on the sleeve for securing the open side of the tubular body together with the belt encased therein. The cushion thus presents a broad, resilient, gently curved surface in all directions and prevents abrasive contact of the belt with the clothing and neck of the wearer.

U.S. Pat. No. 5,573,306

Inventor: Evan M. Galloway et al.

Issued: Nov. 12, 1996

A non-slip seat belt cover includes an elongated, rectangular section of covering material having an interior surface and an exterior surface; a first elongated strip of hook-and-pile fastener, attached along one of the longer edges of the exterior surface; a second elongated strip of hook-and-pile fastener, attached along the longer edge of the interior surface opposite the edge to which the first fastener strip is attached; and a securing mechanism including a plurality of prong members secured to the interior surface of the interior surface adjacent one of the shorter ends of the rectangular section. The securing member is preferably a cleat pad having a plurality of rows of prong members extending from the cleat pad. The prong members are preferably angled with respect to the cleat pad at an angle between twenty-five and sixty degrees. When angled prong members are utilized, the point of the prongs should be oriented away from the adjacent shorter edge of the rectangular section.

U.S. Pat. No. 5,584,536

Inventor: Edwin J. White

Issued: Dec. 17, 1996

The present device relates to a seat belt cushioning device which is adapted to be positioned over the existing seat belt of a vehicle. More specifically, the present device is adapted to be positioned over the shoulder restraint portion of a vehicle seat belt in order to reduce any pressure that is applied to the chest of a wearer. The present device defines particular application with users who have recently undergone heart surgery and need to avoid any excess pressures that may otherwise be applied to the chest. Thus, the device of the present device is adapted to be secured over the shoulder restraint of a vehicle seat belt to reduce any pressures that are applied to the chest of a wearer.

U.S. Pat. No. 5,620,234

Inventor: Judy W. Gunby

Issued: Apr. 15, 1997

The present device relates to a seat belt cushion that includes a cushion comprising a foam like interior which is permanently encased by a cushion face. In the preferred embodiment, VELCRO (TM) fastening elements enable the device to be secured to a seat belt by means of a VELCRO (TM) backing secured to the length of the seat belt. The seat belt cushion, therefore, can be attached anywhere along the length of the seat belt. Once secured, the seat belt cushion may be slid along the length of the seat belt in order to adjust to fit an individual of any height, weight, gender or other physical characteristics. The seat belt cushion is manufactured in a variety of lengths, widths and degrees of thickness to accommodate the demands of the particular user. Moreover, the seat belt cushion can be utilized in conjunction with the seat belts of automobiles, trucks, buses and airplanes. Protracted sides on either distal end of the cushion prevent the entire seat belt from contacting the user's torso. Further, the face of the cushion padding comprises protruding columns of varying lengths, enabling the seat belt cushion to function as a massaging means.

While these seat belt shoulder attachments may be suitable for the purposes for which they were designed, they would not be as suitable for the purposes of the present invention, as hereinafter described.

SUMMARY OF THE PRESENT INVENTION

The present invention addresses the shortcomings of the prior art by providing a rigid three-piece interlocking seat belt shoulder harness retaining device that can be adjusted to an appropriate length to maximize the user's comfort level by forcing a bow in the shoulder harness that displaces the seat belt off the user. The three pieces telescopically adjust to allow a variable amount of bow in the shoulder harness to assist the user in finding the optimum position. In one embodiment, the three pieces are arcuately shaped, thus presenting a bow that extends from the seat belt positioning member, from which the shoulder harness extends above the shoulder, to the latching member on the seat belt that is inserted into the female latch member. The device has specially adapted ends for positioning the device ends against the seat belt positioning member and the latching member.

A primary object of the present invention is to provide a seat belt shoulder harness retainer device that reduces or eliminates the contact of the shoulder harness to the user by maintaining the shoulder harness from the upper seat belt positioning member to the seat belt latching member, in an arced position slightly offset from the user's body, while not affecting the effectiveness of the seat belt.

Another object of the present invention is to provide a seat belt shoulder harness retainer device that would increase automotive safety by encouraging drivers and passengers to wear seat belts who would ordinarily not do so because of discomfort caused by the pressure of the shoulder harness.

Still another object of the present invention is to provide a seat belt shoulder harness retainer device that will not cause the wrinkling of clothes caused by the friction and pressure of the shoulder harness against the user's clothes.

A further object of the present invention is to provide a seat belt shoulder harness retainer device that is comprised of a central section and two extension sections that telescope into said central section and are releasably secured once collapsed or extended to any one of a plurality of lengths in order to accommodate different sized drivers and vehicles.

Another object of the present invention is to provide a seat belt shoulder harness retainer device wherein the distal ends of a fully assembled device have flexible ends to help compensate for twisting that might occur at the seat belt positioning member and latching member.

Yet another object of the present invention is to provide a seat belt shoulder harness retainer device wherein the shoulder harness is easily slipped into position within the present invention through the open recess between retaining flanges.

Still another object of the present invention is to provide a seat belt shoulder harness retainer device that is simple and easy to use.

A seat belt attachment device is provided for seat belt systems having an upper seat belt end positioning member and a lower seat belt end latching member, the device comprising: an elongated central member, an elongated upper member, and an elongated lower member, each of said members having a bottom portion, a first and second side portion, a top portion having an opening, a first end and a second end; the top, bottom and side portions being adapted to closely receive the seat belt and retain the seat belt in a generally flat position within said members; the elongated central member first end being adapted to closely receive and secure the upper member second end, the elongated central member second end being adapted to closely receive and secure the lower member first end; the combined length of the members exceeding the distance between the seat belt positioning member and the seat belt latching member; and the members being constructed of a generally stiff material, such that the excess length causes the combined members to form a bow.

In another embodiment, the upper member second end is slidably securable at a plurality of positions within the central member.

In another embodiment, the lower member first end is slidably securable at a plurality of positions within the central member.

In another embodiment, the upper member second end is slidably securable at a plurality of positions within the central member and the lower member first end is slidably securable at a plurality of positions within the central member.

In another embodiment, the upper member first end is adapted to closely receive the seat belt positioning member.

In another embodiment, the lower member second end is adapted to closely receive the seat belt latching member.

In another embodiment, the upper member first end is flexible.

In another embodiment, the lower member second end is flexible.

In another embodiment, at least one of the upper member side portions has a plurality of spaced protrusions, and at least one of the central member side portions has a plurality of holes adapted to receive and secure the protrusions, said securement securing the upper member first end within the central member.

In another embodiment, at least one of the lower member side portions has a plurality of spaced protrusions, and at least one of the central member side portions has a plurality of holes adapted to receive and secure the protrusions, said securement securing the lower member first end within the central member.

In another embodiment, at least one of the upper member side portions has a plurality of spaced protrusions, and at least one of the central member side portions, has a plurality of holes adapted to receive and secure the protrusions, said securement securing the upper member first end within the central member; and at least one of the lower member side portions has a plurality of spaced protrusions, and at least one of the central member side portions has a plurality of holes adapted to receive and secure the protrusions, said securement securing the lower member first end within the central member.

In another embodiment, the top portions have a plurality of tabs each tab having an end and each tab extending across part of the top portion opening, the top portion opening at each tab end being narrower than the seat belt width.

In another embodiment, the tabs are positioned in opposing pairs.

In another embodiment, the central member is arcuately shaped.

In another embodiment, the upper member is arcuately shaped.

In another embodiment, the lower member is arcuately shaped.

In another embodiment, the upper and lower members are arcuately shaped.

In another embodiment, a seat belt attachment device is provided for seat belt systems having an upper seat belt end positioning member and a lower seat belt end latching member, the device comprising: an elongated central member, an elongated upper member, and an elongated lower member, each of said members having a first end and a second end; means for closely receiving and retaining the seat belt in a generally flat position within said members; means for closely receiving and securing the upper member second end within the central member first end, and means for closely receiving and securing the lower member first end within the central member second end; the combined length of the members exceeding the distance between the seat belt positioning member and the seat belt latching member; and the members being constructed of a generally stiff material, such that the excess length causes the combined members to form a bow.

In another embodiment, the device further comprises means for slidably securing the upper member second end at a plurality of positions within the central member.

In another embodiment, the device further comprises means for slidably securing the lower member first end at a plurality of positions within the central member.

In another embodiment, the upper member first end further comprises means for closely receiving the seat belt positioning member.

In another embodiment, the lower member second end further comprises means for closely receiving the seat belt latching member.

In another embodiment, a seat belt attachment device is provided for seat belt systems having an upper seat belt end positioning member and a lower seat belt end latching member, the device comprising: an elongated central member, an elongated upper member, and an elongated lower member, each of said members having a bottom portion, a first and second side portion, a top portion having an opening, a first end and a second end; the top, bottom and side portions being adapted to closely receive the seat belt and retain the seat belt in a generally flat position within said members; the elongated central member first end being adapted to closely receive and secure the upper member second end, the elongated central member second end being adapted to closely receive and secure the lower member first end; the combined length of the members extending at least from proximate the seat belt positioning member to proximate the seat belt latching member; the central member being arcuately shaped; and the members being constructed of a generally stiff material.

In another embodiment, the upper member is arcuately shaped.

In another embodiment, the lower member is arcuately shaped.

In another embodiment, the upper and lower members are arcuately shaped.

In another embodiment, a seat belt attachment device is provided for seat belt systems having an upper seat belt end positioning member and a lower seat belt end latching member, the device comprising: an elongated central member, an elongated upper member, and an elongated lower member, each of said members having a first end and a second end; means for closely receiving and retaining the seat belt in a generally flat position within said members; means for closely receiving and securing the upper member second end within the central member first end, and means for closely receiving and securing the lower member first end within the central member second end; the combined length of the members extending at least from proximate the seat belt positioning member to proximate the seat belt latching member; the central member being arcuately shaped; and the members being constructed of a generally stiff material.

In another embodiment, the upper member is arcuately shaped.

In another embodiment, the lower member is arcuately shaped.

In another embodiment, the upper and lower members are arcuately shaped.

Additional objects of the present invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views.

DESCRIPTION OF THE REFERENCED NUMERALS

Figure 1:
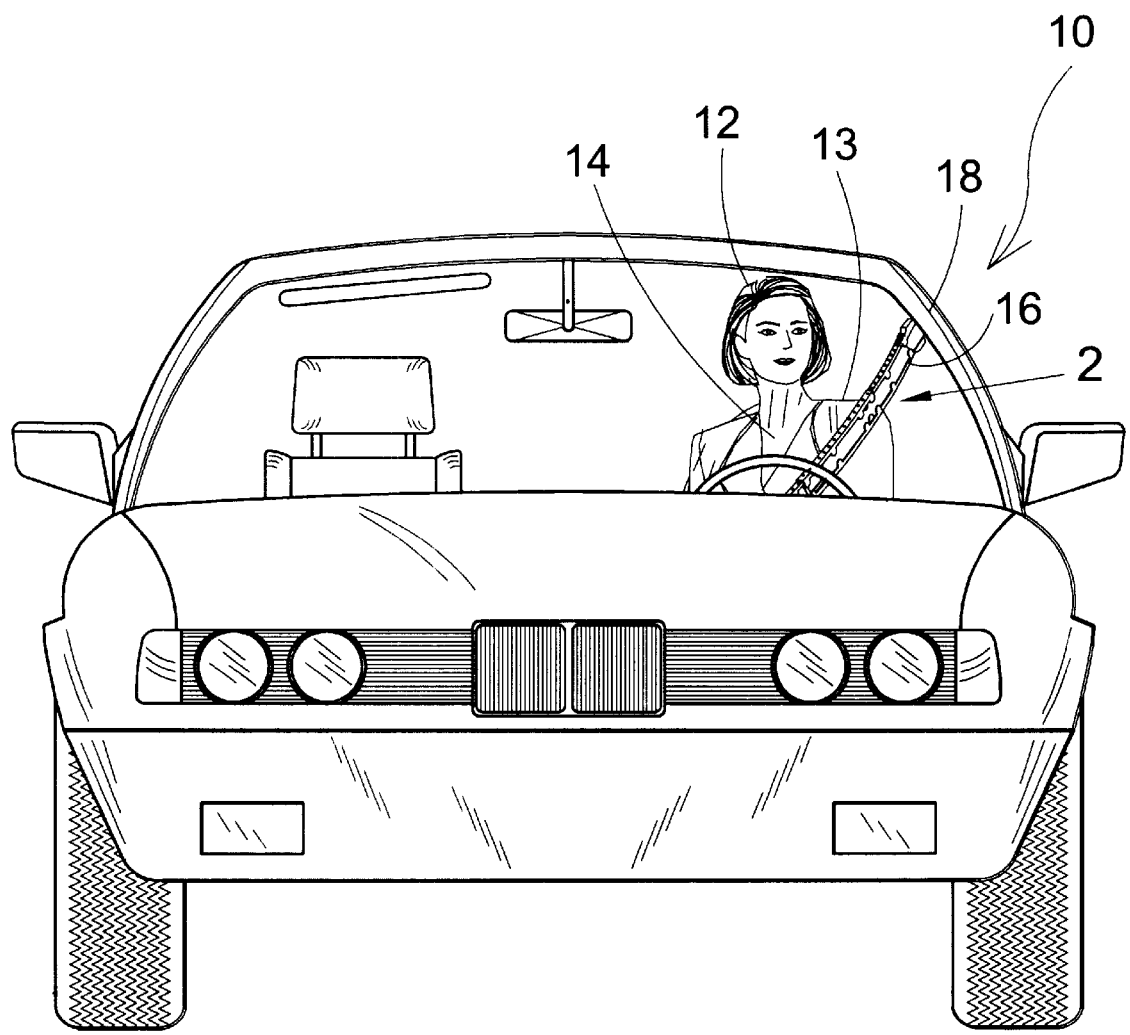
FIG. 1 is front view of the present invention in use.

Turning now descriptively to the drawings, in which similar reference characters denote similar elements throughout the several views, the figures illustrate the Seat Belt Shoulder Harness Retainer Device of the present invention. With regard to the reference numerals used, the following numbering is used throughout the various drawing figures.

10 Seat Belt Shoulder Harness Retainer Device of the present invention
12 belted occupant
13 occupant's shoulder
14 occupant's torso
15 occupant's abdomen
16 seat belt system shoulder harness
17 seat belt system shoulder harness positioning member
18 vehicle frame
19 seat belt system seat belt latching member
20 central member
22 upper member
24 lower member
26 central member first end
28 central member second end
30 central member bottom portion
32 central member first side portion
34 central member second side portion
36 central member top portion
38 central member side portion holes
40 central member top portion opening
42 central member top portion tabs
44 upper member first end
46 upper member second end
48 upper member bottom portion
50 upper member first side portion
52 upper member second side portion
54 upper member top portion
56 upper member top portion opening
58 upper member top portion tabs
60 upper member side portion protrusions
62 lower member first end
64 lower member second end
66 lower member bottom portion
68 lower member first side portion
70 lower member second side portion
72 lower member top portion
74 lower member top portion opening
76 lower member top portion tabs
78 lower member side portion protrusions
80 upper member first end clip member
82 upper member first end ribs
84 lower member second end ribs

DETAILED DESCRIPTION OF THE PREFERRED EMBODIMENTS

The following discussion describes in detail one embodiment of the invention and several variations of that embodiment. This discussion should not be construed, however, as limiting the invention to those particular embodiments. Practitioners skilled in the art will recognize numerous other embodiments as well. For a definition of the complete scope of the invention, the reader is directed to the appended claims.

Turning now descriptively to the drawings, in which similar reference characters denote similar elements throughout the several views, FIGS. 1–7 illustrate the Seat Belt Shoulder Harness Retainer Device of the present invention indicated generally by the numeral 10.

Figure 2:
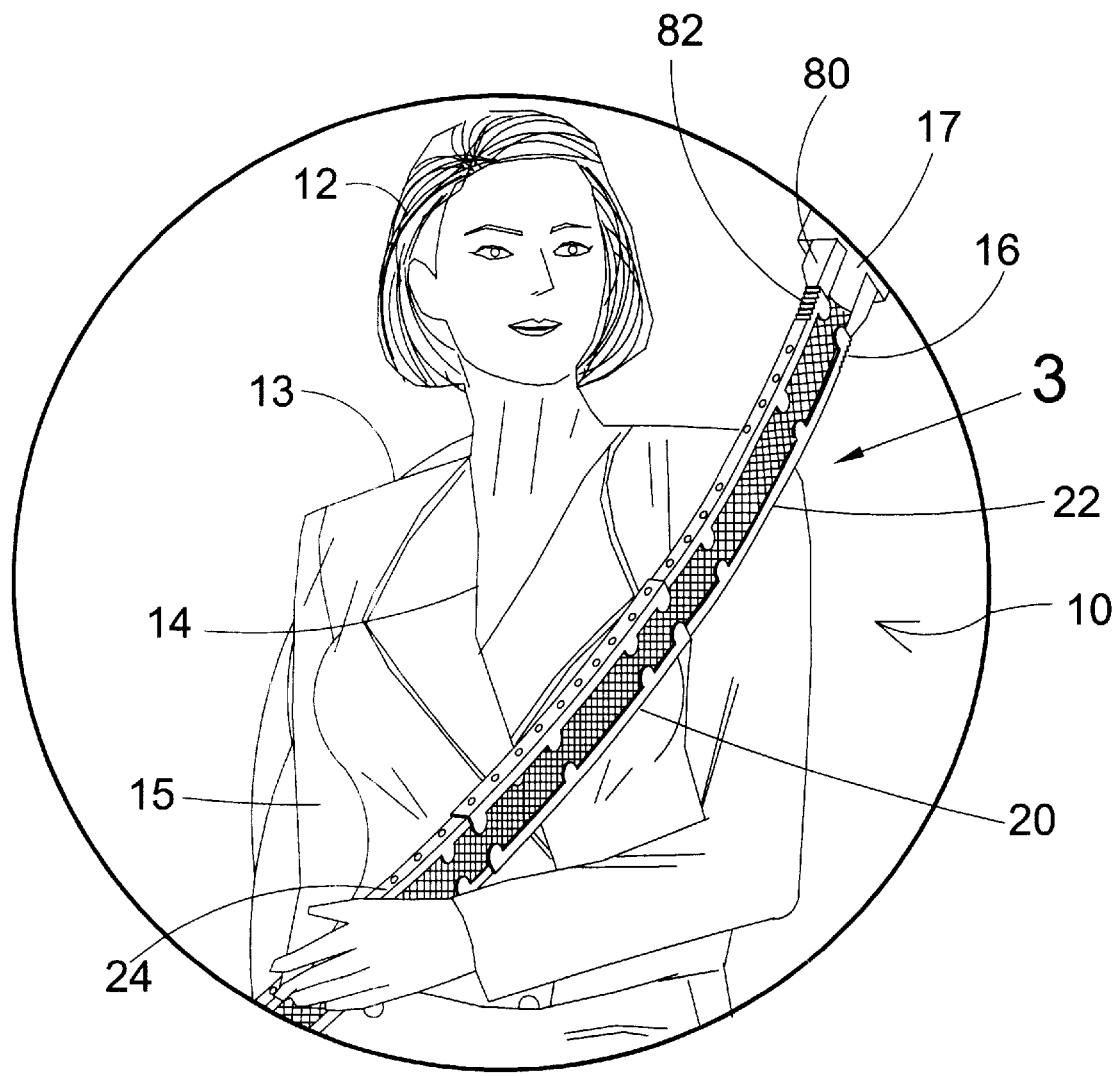
FIG. 2 is a detailed front view of the present invention use.
Figure 3:
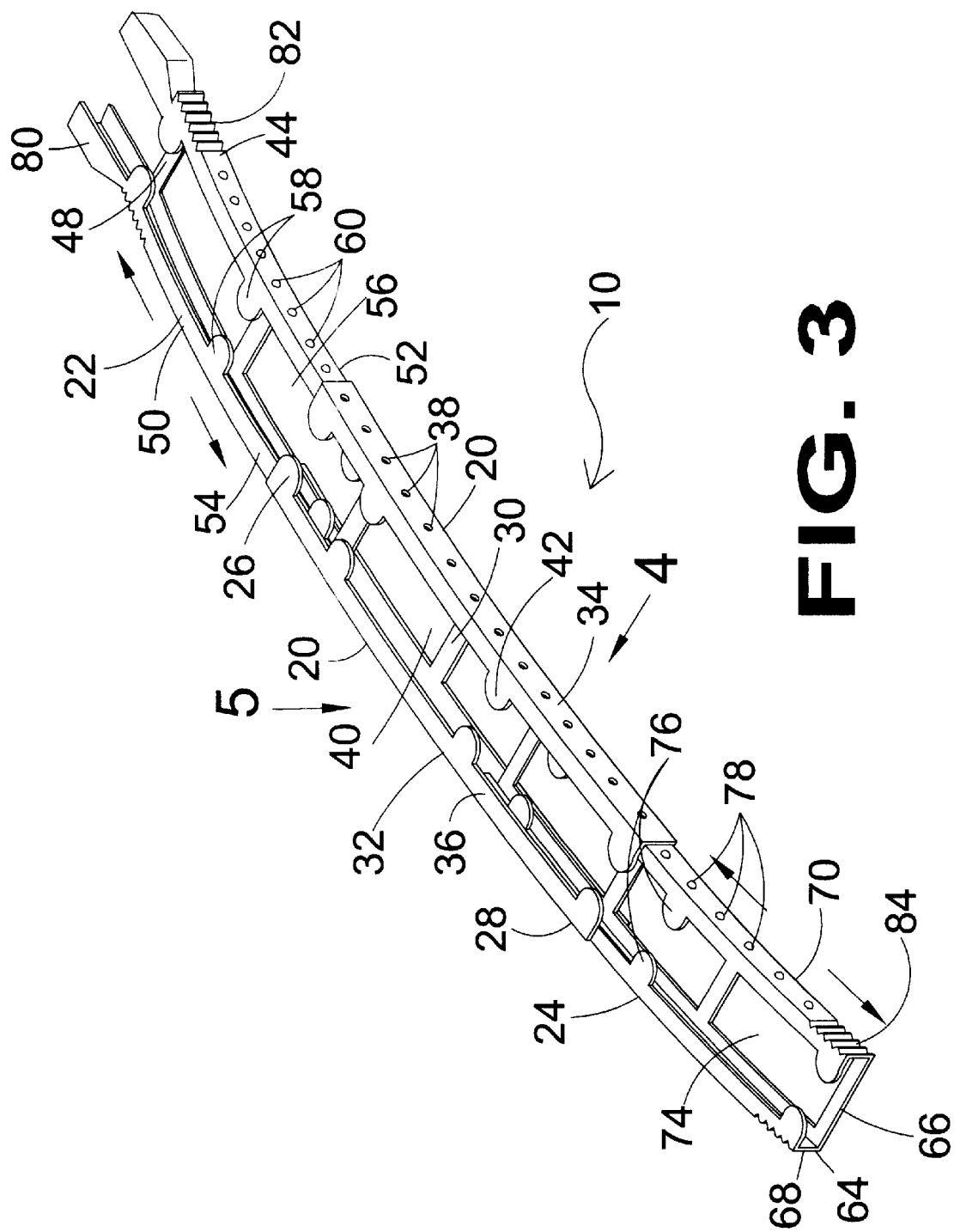
FIG. 3 is a perspective view of the present invention fully assembled but not installed.

The device 10 is shown generally in FIGS. 1–7 and in use by the belted occupant 12 in FIGS. 1–2. The user's shoulder 13, torso 14, and abdomen 15 are normally contacted along the adjacent length of the seat belt system shoulder harness 16. In the common seat belt system, the belt 16 extends from a positioning member 17 mounted to the vehicle frame 18, commonly called a D-ring, although some systems have a retractor housing in a similar position. At the other end, the typical system seat belt 16 has a latching member 19, usually a latch plate that couples with a female latch member.

The device 10 is formed by the assembly of an elongated central member 20 with elongated upper 22 and lower members 24. The central member 20 has a first end 26, a second end 28, a substantially planar bottom portion 30, first side portion 32, second side portion 34, and top portion 36. The side portions 32,34 each have a plurality of evenly spaced holes 38. The top portion 36 has an opening 40 that is partially defined by inwardly extending and opposing tab pairs 42. In other embodiments, the tabs are staggered or on one side only.

The members 20,22,24 are constructed from a rigid material, prefer ably a plastic material.

Figure 4:
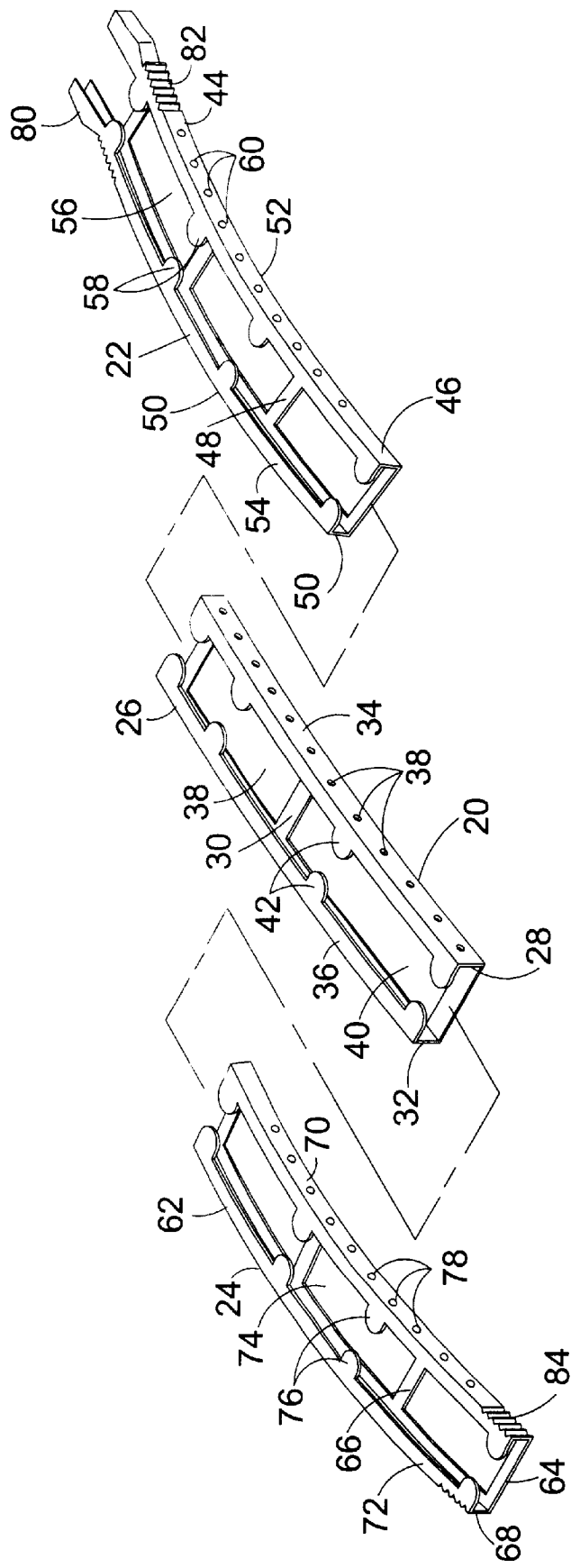
FIG. 4 is an exploded perspective view of the present invention.

As shown in FIG. 4, the upper member 22 has some similar features to the central member 20, to wit: a first end 44, a second end 46, a substantially planar bottom portion 48, first side portion 50, second side portion 52, and top portion 54. Likewise, the top portion 54 has an opening 56 that is partially defined by inwardly extending and opposing tab pairs 58. In other embodiments, the tabs are staggered or on one side only. The side portions 50,52 each have a plurality of evenly spaced protrusions 60.

The lower member 24 has several features in common with the upper member, including a first end 62, a second end 64, a substantially planar bottom portion 66, first side portion 68, second side portion 70, and top portion 72. Likewise, the top portion 72 has an opening 74 that is partially defined by inwardly extending and opposing tab pairs 76. In other embodiments, the tabs are staggered or on one side only. As with the upper member 22, the side portions 68,70 each have a plurality of evenly spaced protrusions 78.

Figure 6:
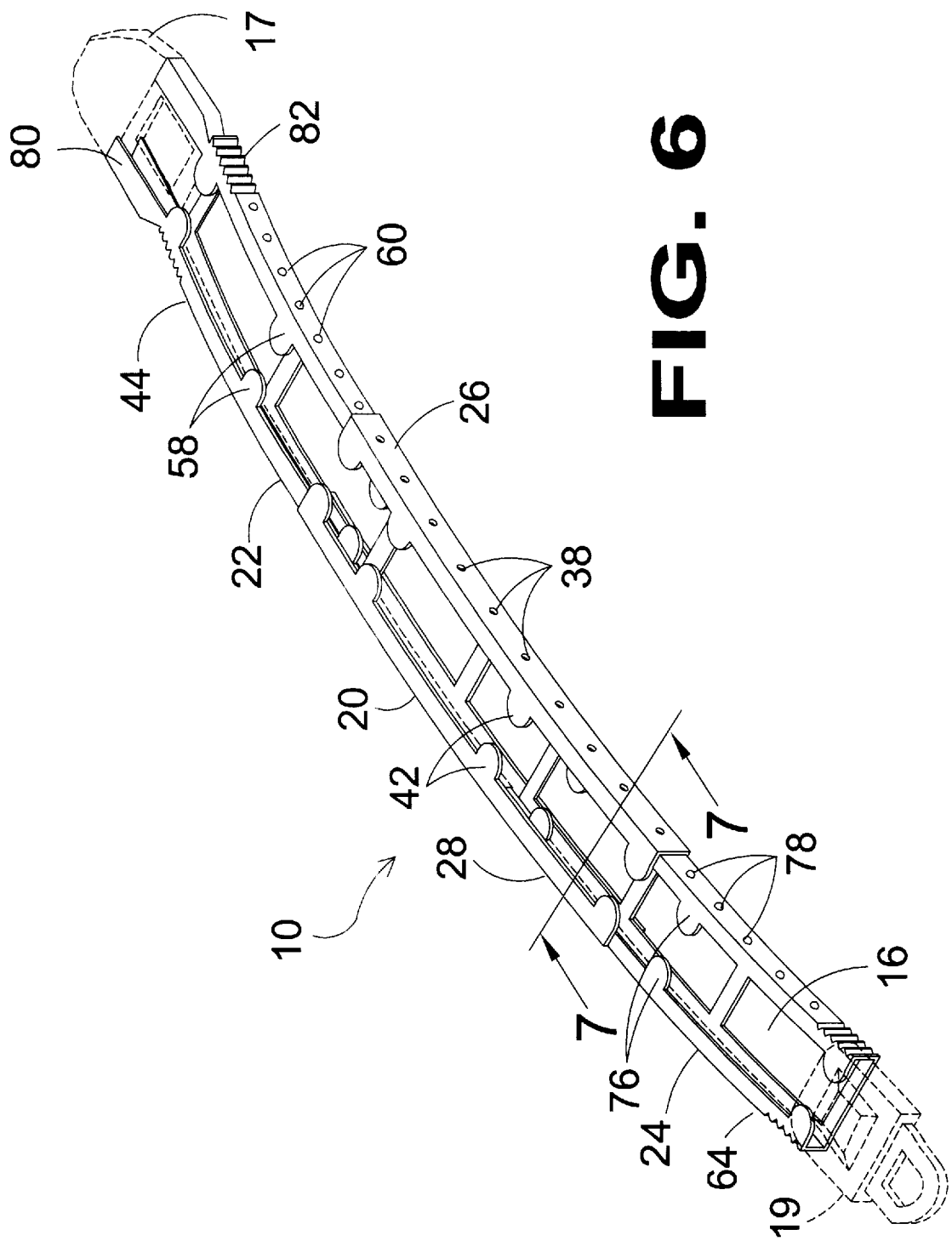
FIG. 6 is a perspective view of the present invention with the seat belt latching member and seat belt positioning member shown in hidden line.
Figure 7:
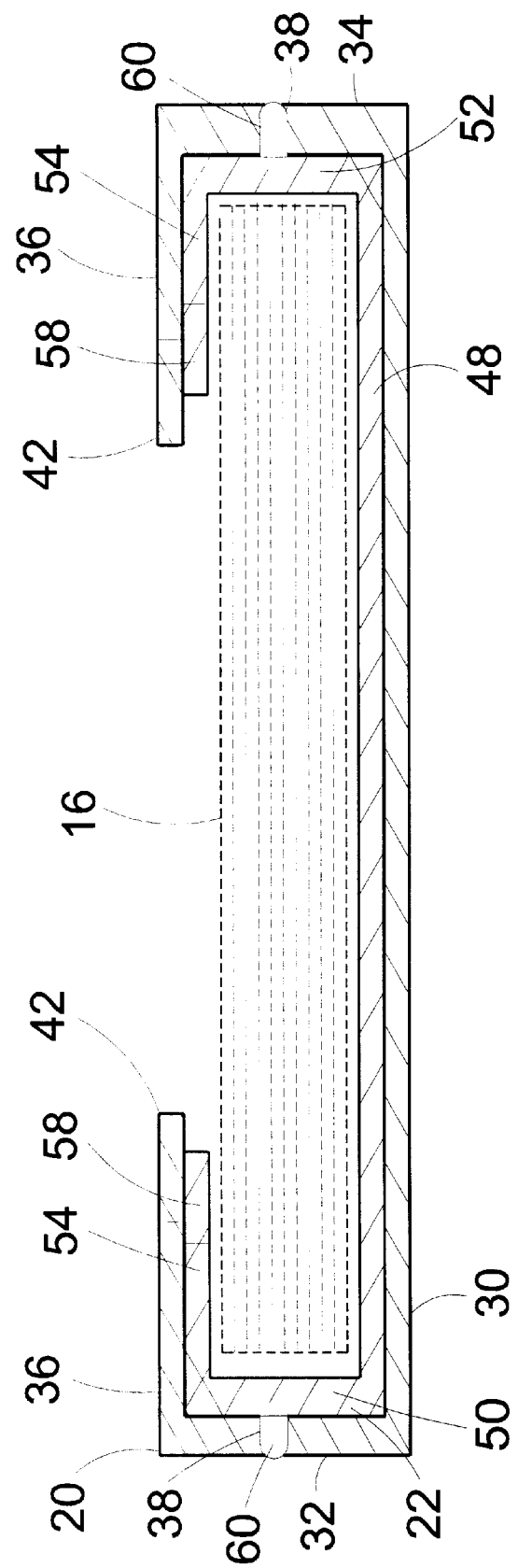
FIG. 7 is a sectional view of the present invention taken from FIG. 6 as indicated.

As shown in FIG. 6, the upper member first end 44 has a clip member 80 that is adapted such that it grasps all or part of the positioning member 17 providing a secure placement of the upper member first end 44 against the positioning member 17.

A degree of flexibility is provided at the interface of the upper member 22 and the positioning member 17, by ribs 82. This flexibility can be provided to account for possible rotation of the positioning member 17 during ordinary use.

The clip member 80 can be provided in various configurations to accommodate the positioning members present in the various seat belt systems in different makes and types of vehicles. The present invention will also perform adequately without the clip member 80 and/or the ribs 82, with the upper member first end 44 bearing directly on the positioning member 17.

Similarly, a special clip can be provided at the lower member second end 64 to form a precise fit with latching members of various shapes. In the embodiment shown in FIG. 4, no such clip is necessary to accommodate the latching member 19. Ribs 84 are present on the lower member second end 64 to provide the limited flexibility discussed above.

To decrease the weight of the device 10, the member's bottom portions 30,48,66 have large openings 86.

To utilize the device 10, the user 12 inserts the belt 16 through the top portion openings 40,56,74, and under the tabs 42,58,76, of members 20,22,24. When properly inserted the shape of the members 20,22,24 ensures that the seat belt 16 lies flat within the device 10, with little or no lateral movement.

Figure 5:
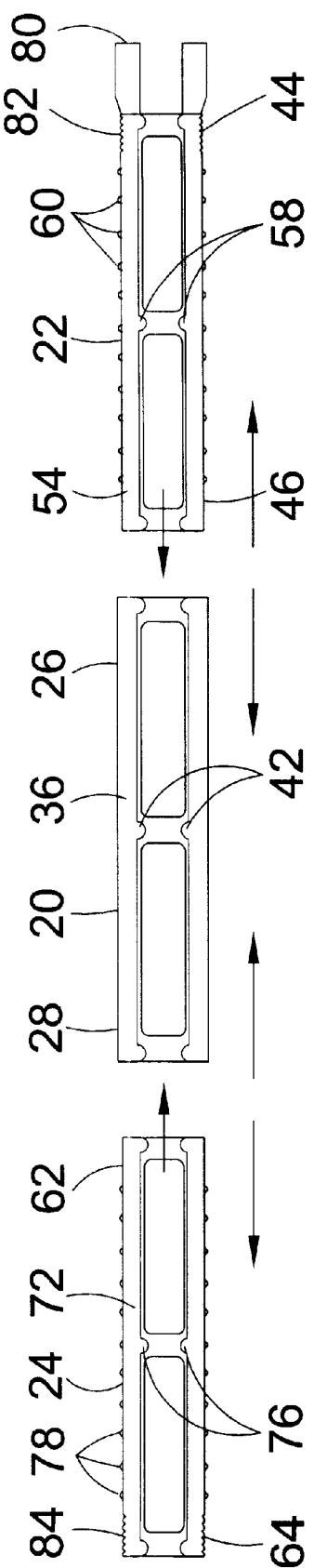
FIG. 5 is an exploded top view of the present invention.

At this point, and as shown in FIG. 5, the user 12 moves the central member second end 28 toward the lower member first end 62 such that the lower member first end 62 is inserted within the central member 20. The user 12 continues this action until the lower member side portion protrusions 78 align with, and are closely received and secured by, the appropriate central member side portion holes 38.

When the lower member 24 is so inserted and secured, the user 12 then inserts the upper member second end 46 into the central member first end 26 until the upper member side portion protrusions 60 are aligned with, and secured by, the central member side portion holes 38.

The desired protrusion 60,78 alignment with the central member side portion holes 38, is determined when the user 12 attaches the upper member first end clip member 80 to the positioning member 17, and likewise positions the lower member second end 64 against or about the latching member 19. The extension of the upper and lower members 22,24 from the central member 20 for these purposes will continue until a bow is formed in the device 10. The bow results as one or both of the upper member 22 and lower member 24 are extended from the central member 20 after the upper member first end clip member 80 is attached to the positioning member 17, and the lower member second end bears on the seat belt latching member 19. Such additional extension causes the rigid device 10 to bow from the positioning member 17 to the latching member 19. Such extension is continued until the bow is of sufficient magnitude to displace the device 10 from the occupant's shoulder 13, torso 14, and abdomen 15.

In another embodiment, or in combination with the preferred embodiment, one or more of the central, upper or lower members are arcuately shaped such that when the combined length of the members is properly adjusted to cause the device ends to abut the seat belt positioning member and latching member, the bow is formed by such arcuate features, and displaces the shoulder harness off the user. This manner of creating the bow can be achieved independently, or in addition to the bow contribution discussed in the foregoing paragraph.

The device 10 and its foregoing components can be constructed using various materials, including various plastics. The materials, in various component combinations, can be sized to accommodate users of various sizes, all in accordance with the present invention, and as determined by the intended end use for the overall device.

With respect to the above description then, it is to be realized that the optimum material and dimensional relationships for the members 20,22,24, to include variations in size, materials, shape, and form, will occur to those skilled in the art upon review of the present disclosure, and all equivalent relationships to those illustrated in the drawings and described in the specification are intended to be encompassed by the present invention.

What is claimed as new and desired to be protected by Letters Patent is set forth in the appended claims:

1. A seat belt attachment device for seat belt systems having an upper seat belt end positioning member and a lower seat belt end latching member, the device comprising:

an elongated central member, an elongated upper member, and an elongated lower member, each of said members having a bottom portion, a first and second side portion, a top portion having an opening, a first end and a second end;

the top, bottom and side portions being adapted to closely receive the seat belt and retain the seat belt in a generally flat position within said members;

the elongated central member first end being adapted to closely receive and secure the upper member second end, the elongated central member second end being adapted to closely receive and secure the lower member first end;

the combined length of the members adapted to exceed the distance between the seat belt positioning member and the seat belt latching member; and the members being constructed of a generally stiff material, such that the excess length causes the combined members to form a bow.

2. The device of claim 1, wherein the upper member second end is slidably securable at a plurality of positions within the central member.

3. The device of claim 1, wherein the lower member first end is slidably securable at a plurality of positions within the central member.

4. The device of claim 1, wherein the upper member second end is slidably securable at a plurality of positions within the central member and the lower member first end is slidably securable at a plurality of positions within the central member.

5. The device of claim 1, wherein the upper member first end is adapted to closely receive the seat belt positioning member.

6. The device of claim 1, wherein the lower member second end is adapted to closely receive the seat belt latching member.

7. The device of claim 1, wherein the upper member first end is flexible.

8. The device of claim 1, wherein the lower member second end is flexible.

9. The device of claim 1, wherein at least one of the upper member side portions has a plurality of spaced protrusions, and at least one of the central member side portions has a plurality of holes adapted to receive and secure the protrusions, said securement securing the upper member first end within the central member.

10. The device of claim 1, wherein at least one of the lower member side portions has a plurality of spaced protrusions, and at least one of the central member side portions has a plurality of holes adapted to receive and secure the protrusions, said securement securing the lower member first end within the central member.

11. The device of claim 1, wherein:

at least one of the upper member side portions has a plurality of spaced protrusions, and at least one of the central member side portions has a plurality of holes adapted to receive and secure the protrusions, said securement securing the upper member first end within the central member; and at least one of the lower member side portions has a plurality of spaced protrusions, and at least one of the central member side portions has a plurality of holes adapted to receive and secure the protrusions, said securement securing the lower member first end within the central member.

12. The device of claim 1, wherein the top portions have a plurality of tabs each tab having an end and each tab extending across part of the top portion opening, the top portion opening at each tab end being narrower than the seat belt width.

13. The device of claim 12, wherein the tabs are positioned in opposing pairs.

14. The device of claim 1, wherein the central member is arcuately shaped.

15. The device of claim 1, wherein the upper member is arcuately shaped.

16. The device of claim 1, wherein the lower member is arcuately shaped.

17. The device of claim 1, wherein the upper and lower members are arcuately shaped.

18. A seat belt attachment device for seat belt systems having an upper seat belt end positioning member and a lower seat belt end latching member, the device comprising:

an elongated central member, an elongated upper member, and an elongated lower member, each of said members having a first end and a second end;

means for closely receiving and retaining the seat belt in a generally flat position within said members;

means for closely receiving and securing the upper member second end within the central member first end, and means for closely receiving and securing the lower member first end within the central member second end;

the combined length of the members adapted to exceed the distance between the seat belt positioning member and the seat belt latching member; and the members being constructed of a generally stiff material, such that the excess length causes the combined members to form a bow.

19. The device of claim 18, wherein the device further comprises means for slidably securing the upper member second end at a plurality of positions within the central member.

20. The device of claim 18, wherein the device further comprises means for slidably securing the lower member first end at a plurality of positions within the central member.

21. The device of claim 18, wherein the upper member first end further comprises means for closely receiving the seat belt positioning member.

22. The device of claim 18, wherein the lower member second end further comprises means for closely receiving the seat belt latching member.

23. A seat belt attachment device for seat belt systems having an upper seat belt end positioning member and a lower seat belt end latching member, the device comprising:

an elongated central member, an elongated upper member, and an elongated lower member, each of said members having a bottom portion, a first and second side portion, a top portion having an opening, a first end and a second end;

the top, bottom and side portions being adapted to closely receive the seat belt and retain the seat belt in a generally flat position within said members;

the elongated central member first end being adapted to closely receive and secure the upper member second end, the elongated central member second end being adapted to closely receive and secure the lower member first end;

the combined length of the members adapted to extend at least from proximate the seat belt positioning member to proximate the seat belt latching member;

the central member being arcuately shaped; and the members being constructed of a generally stiff material.

24. The device of claim 23, wherein the upper member is arcuately shaped.

25. The device of claim 23, wherein the lower member is arcuately shaped.

26. The device of claim 23, wherein the upper and lower member are arcuately shaped.

27. A seat belt attachment device for seat belt systems having an upper seat belt end positioning member and a lower seat belt end latching member, the device comprising:

an elongated central member, an elongated upper member, and an elongated lower member, each of said members having a first end and a second end;

means for closely receiving and retaining the seat belt in a generally flat position within said members;

means for closely receiving and securing the upper member second end within the central member first end, and means for closely receiving and securing the lower member first end within the central member second end;

the combined length of the members adapted to extend at least from proximate the seat belt positioning member to proximate the seat belt latching member;

the central member being arcuately shaped; and the members being constructed of a generally stiff material.

28. The device of claim 27, wherein the upper member is arcuately shaped.

29. The device of claim 27, wherein the lower member is arcuately shaped.

30. The device of claim 27, wherein the upper and lower member are arcuately shaped.

* * * * *